United States Patent
Yi

(10) Patent No.: US 7,146,688 B2
(45) Date of Patent: Dec. 12, 2006

(54) APPARATUS AND METHOD FOR ENGAGING CABLES

(75) Inventor: George Youghzi Yi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/016,655

(22) Filed: Dec. 17, 2004

(65) Prior Publication Data

US 2006/0130290 A1     Jun. 22, 2006

(51) Int. Cl.
*F16G 11/00*        (2006.01)
(52) U.S. Cl. .......................... 24/129 B; 24/552; 24/563
(58) Field of Classification Search ............ 24/129 B, 24/336, 339, 563, 531, 545, 546, 551–554; 248/68.1, 74.2, 74.1; 439/828, 829, 777, 439/787, 796, 834, 861
See application file for complete search history.

(56) References Cited

U.S. PATENT DOCUMENTS

| 1,552,154 | A | * | 9/1925 | Hatfield | 439/829 |
| 2,806,290 | A | * | 9/1957 | Tiefel | 33/408 |
| 5,077,646 | A | * | 12/1991 | Parsons | 362/252 |
| 5,596,792 | A | * | 1/1997 | Shelton | 24/336 |

OTHER PUBLICATIONS

Richco, "Bend Limiting Tubing Clip", 2004, 1 page.
Richco, "Wire Routing Clips and Clamps", 2004, 9 pages.

* cited by examiner

*Primary Examiner*—James R. Brittain
(74) *Attorney, Agent, or Firm*—Trellis Intellectual Property Law Group, PC

(57) ABSTRACT

A clip comprising a base, a first clasping assembly coupled to the base, and a second clasping assembly coupled to the base. A circuit board assembly comprising a radio circuit board, a pair of RF cables, and a clip assembly secured to the radio circuit board and coupled to the RF cables. A method for securing cables to a substratum comprising passing cables through clasping assemblies.

12 Claims, 5 Drawing Sheets

APPARATUS AND METHOD FOR ENGAGING CABLES

BACKGROUND OF THE INVENTION

1. Field of Invention

The present invention broadly relates in general to an apparatus and method for engaging cables, lines, conduits, and the like. More specifically, embodiments of the present invention relate to a clip assembly and method for engaging cables and holding the cables in a desired position on a substratum, such as a circuit board, or the like.

2. Description of the Background Art

Conventional commercial clips mounted to a circuit board can not hold two RF (radio frequency) cables separately. None of the conventional commercial clips provide multi functions (e.g., grounding, position constrains, etc) nor lead angles for RF cables to route to connectors on a circuit board.

Therefore, it would be desirable to have a clip assembly which is capable of holding at least two RF (Radio Frequency) cables (e.g., cables having a diameter of less than about 1.5 mm) steadily and securely in a same clip which is capable of providing excellent grounding as well as occupying minimal circuit board space.

SUMMARY OF EMBODIMENTS OF THE INVENTION

Embodiments of the present invention provide a clip comprising a base, a first clasping assembly coupled to the base, and a second clasping assembly coupled to the base. The first clasping assembly comprises a first center line, and the second clasping assembly comprises a second center line intersecting the first center line at a generally oblique angle.

Embodiments of the present invention further provide a circuit board assembly comprising a radio circuit board, a first RF cable, a second RF cable, and a clip assembly secured to the radio circuit board. The clip assembly includes a first means for releasably engaging the first RF cable, and a second means for releasably engaging the second RF cable.

Embodiments of the present invention also further provide a method for securing cables to a substratum comprising passing a first cable through a first clasping assembly, passing a second cable through a second clasping assembly, and aligning a longitudinal section of the first cable with a longitudinal section of the second cable. The method for securing cable further comprises securing a terminal end of the first cable to a first connector on a substratum, and securing a terminal end of the second cable to a second connector on a substratum.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
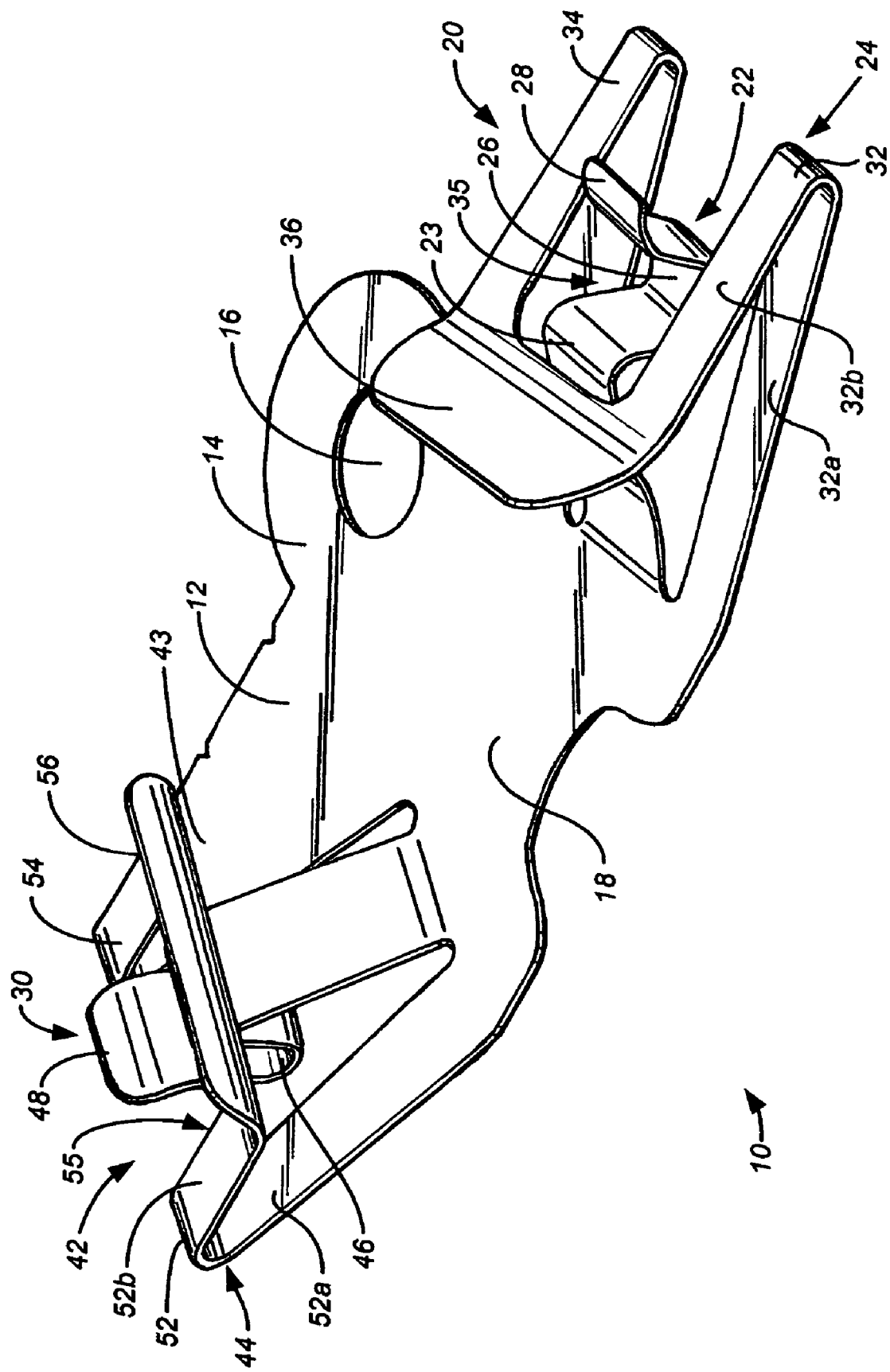
FIG. 1 is a perspective view of the clip assembly.
Figure 2:
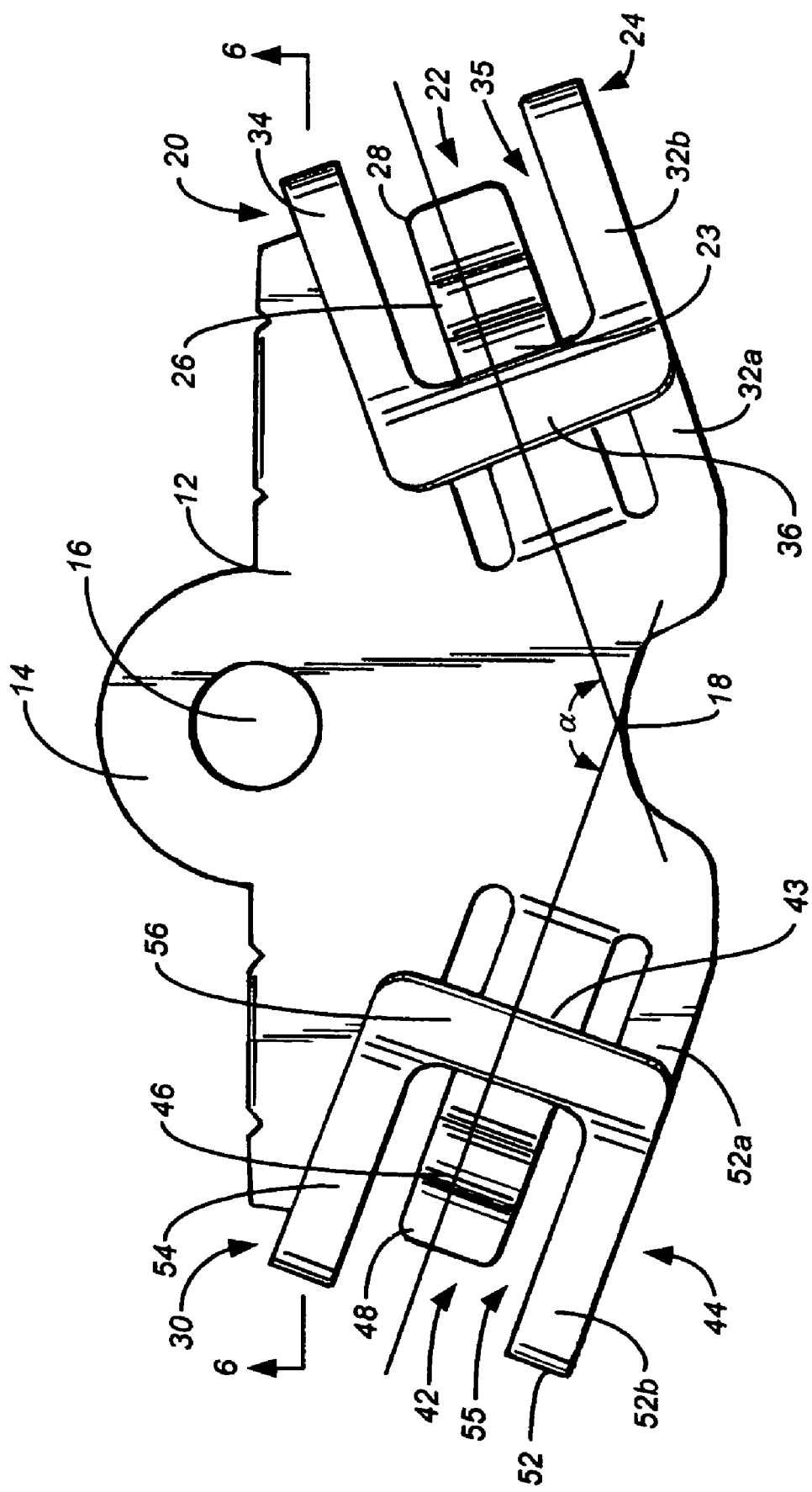
FIG. 2 is a top plan view of the clip assembly.

Referring in detail now to the drawings, there is seen in FIG. 1 a clip assembly, generally illustrated as 10. The clip assembly 10 includes a base 12 having a base tongue 14 formed with an eyelet 16. The base 12 comprises a base protrusion 18 integrally bound to the base 12. The clip assembly 10 further includes a pair of clasping assemblies, generally illustrated as 20 and 30 and having respective center lines 20a and 30a which intersect at a generally oblique angle α as shown in FIG. 2.

The clasping assembly 20 comprises a lower spring member 22 coupled to the base protrusion 18, and an upper spring member 24 coupled partly to the base protrusion 18 and further coupled partly to the base 12. The lower spring member 22 has a generally sinusoidal structure 23 terminating in a lip 28 and having a trough 26 which provides an entrance 27 for receiving a cable, such as cable 41. In an embodiment of the invention, after the lower spring member 22 is depressed in direction of the arrow A in FIG. 3 (e.g., by a user placing a thumb on the lip 28 and then pressing downwardly) to posture the lower spring member 22 in the dashed line position, cable 41 represented by dashed lines in FIG. 3 may be slid in direction of the arrow B until imposed over the trough 26. When the lower spring member 22 is released, cable 41 is snapped into the position illustrated in FIG. 5. Alternatively and in another embodiment, depending on the diameter of cable 41 and recognizing that the lower spring member 22 may have to be depressed slightly, the cable 41 may be removably disposed in trough 26 by sliding an end of the cable 41 into and through the entrance 27.

The upper spring member 24 has a structure defined by a pair of arms 32 and 34 terminating in a lip 36. Arms 32 and 34 have an opening 35 where through the lower spring member 22 extends and is exposed (e.g., the lip 28 is exposed) for operation by the user. Arm 34 is integrally coupled to the base 12. Arm 32 has a skewed structure including a lower arm 32a connected to base protrusion 18 and an upper arm 32b integrally bound to the lower arm 32a and to the lip 36. Lower arm 32a and upper arm 32b are spaced and generally aligned in a vertical relationship with respect to each other.

It is to be recognized that for various embodiments of the invention, the user or operator is able to press the lower spring member 22 downwardly to pass or position the same underneath the base 12 because the clip assembly 10 is mounted on a substratum or board (i.e., a daughter board) in a standoff or spaced position which provides room for the lower spring member 22 to move towards the board without contacting or being hindered by the surface of the board. For other various embodiments of the invention, if the clip assembly 10 is mounted directly to the board, the user or operator may lift the upper spring member 24 to open the cable entrance 27 to allow a cable, such as cable 41, to be snapped into a clipped position.

Clasping assembly 30 is generally a mirror image of clasping assembly 20. More specifically, the clasping assembly 30 comprises a lower spring member 42 coupled to the base protrusion 18, and an upper spring member 44 coupled partly to the base protrusion 18 and further coupled partly to the base 12. The lower spring member 42 has a generally sinusoidal structure 43 terminating in a lip 48 and having a trough 46 which provides an entrance 47 for receiving a cable, such as cable 61. In an embodiment of the invention, after the lower spring member 42 is depressed in direction of the arrow C in FIG. 3 (e.g., by a user places a thumb on the lip 48 and then presses downwardly) to posture the lower spring member 42 in the dashed line position, cable 61 represented by dashed lines in FIG. 3 may be slid in direction of the arrow D until imposed over the trough 46. When the lower spring member 42 is released, cable 61 is snapped into the position illustrated in FIG. 5. Alternatively and in another embodiment, depending on the diameter of cable 61 and recognizing that the lower spring member 42 may have to be depressed slightly, the cable 61 may be removably disposed in trough 46 by sliding an end of the cable 61 into and through the entrance 47.

The upper spring member 44 has a structure defined by a pair of arms 52 and 54 terminating in a lip 56. Arms 52 and 54 have an opening 55 where through the lower spring member 42 extends and is exposed (e.g., the lip 48 is exposed) for operation by the user. Arm 54 is integrally coupled to the base 12. Arm 52 has a skewed structure including a lower arm 52a connected to base protrusion 18 and an upper arm 52b integrally bound to the lower arm 52a and to the lip 56. Lower arm 52a and upper arm 52b are spaced and generally aligned in a vertical relationship with respect to each other.

Figure 3:
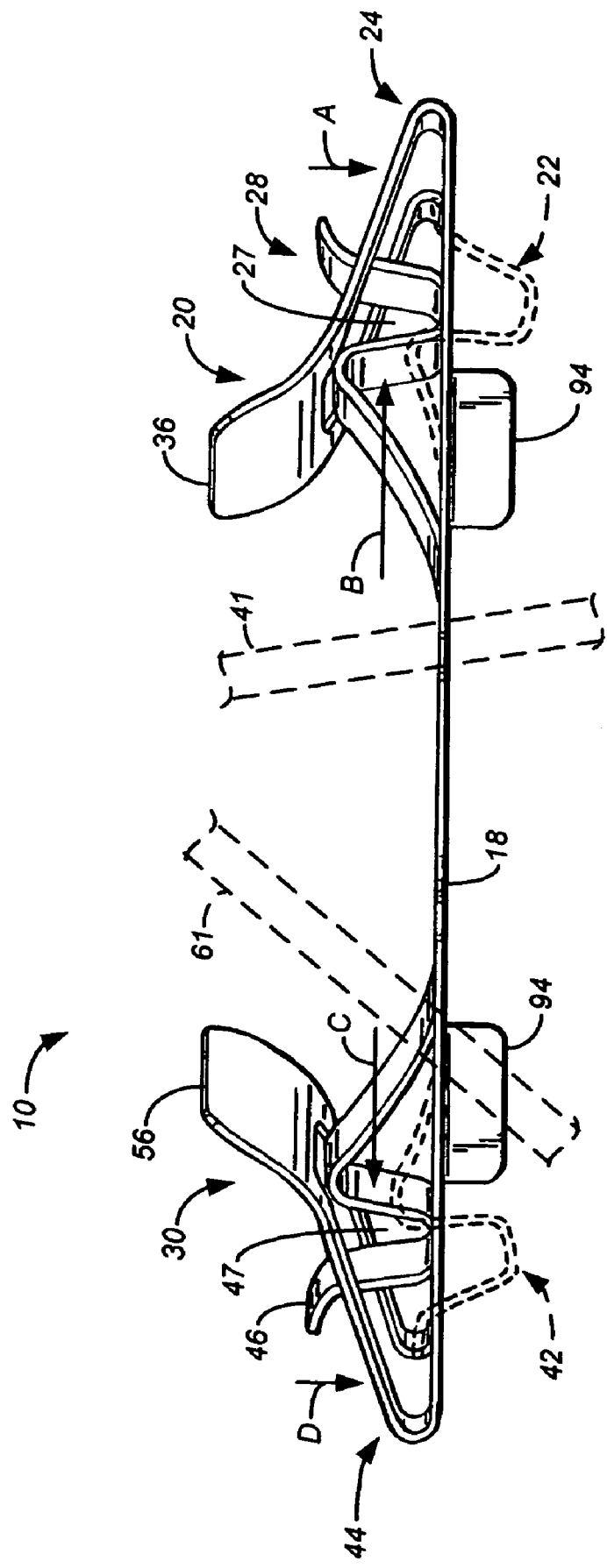
FIG. 3 is a front elevational view of the clip assembly.
Figure 4:
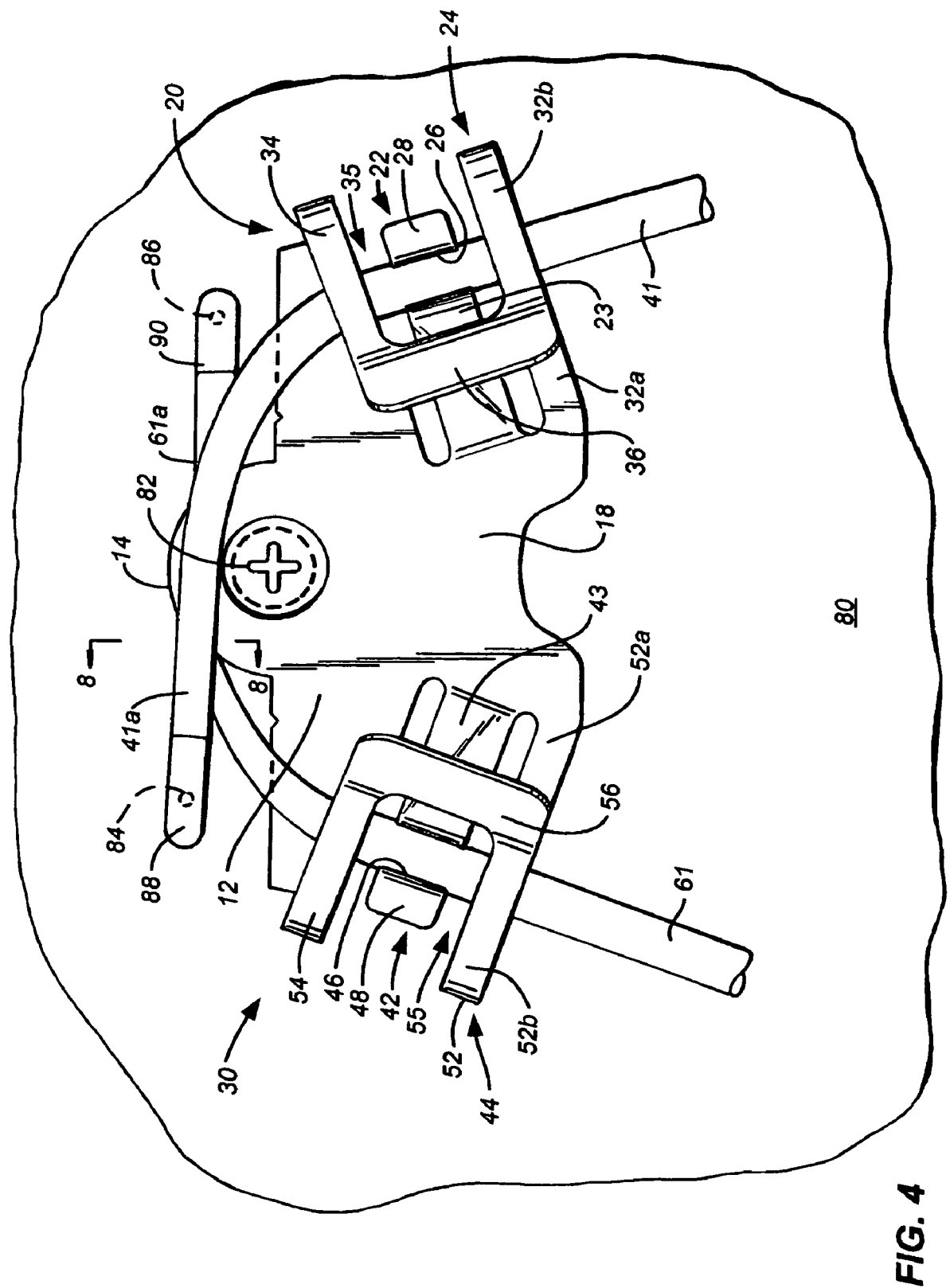
FIG. 4 is a top plan view of the clip assembly engaging a pair of cables and placing the cables in a superimposed relationship such that a longitudinal section of one cable is generally aligned with a longitudinal section of the other cable and the connectors at the end of each cable are generally aligned with each other.
Figure 5:
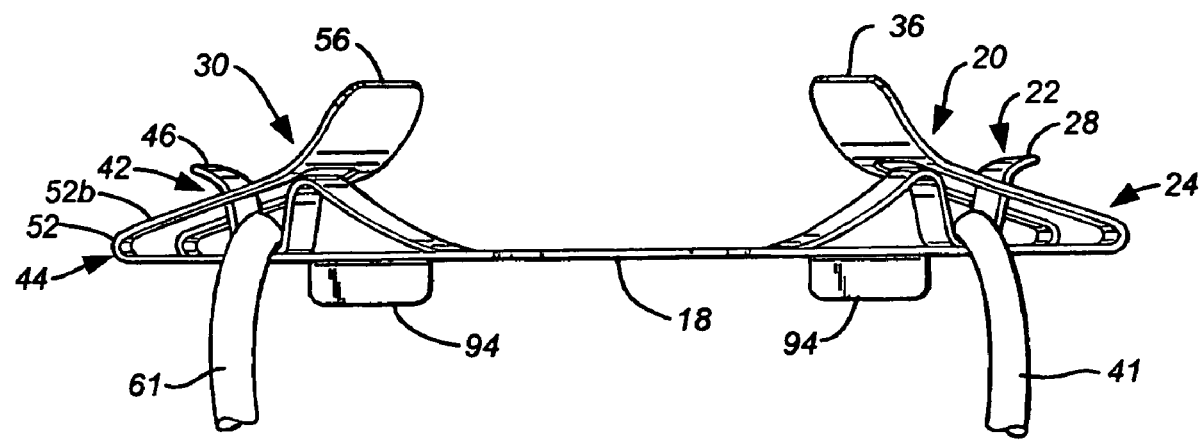
FIG. 5 is a front elevation view of the clip assembly engaged to a pair of cables.
Figure 6:
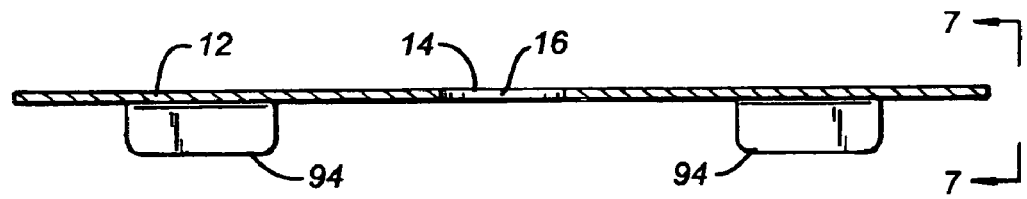
FIG. 6 is a vertical sectional view taken in direction of the arrows and along the plane of line 6—6 in FIG. 2.
Figure 7:
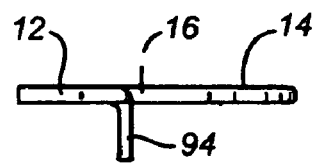
FIG. 7 is a vertical view taken in direction of the arrows and along the plane of line 7—7 in FIG. 6.
Figure 8:
FIG. 8 is a vertical sectional view taken in direction of the arrows and along the plane of line 8—8 in FIG. 2.

The clip assembly 10 comprises a pair of flanges 94—94 coupled to any suitable part of the clip assembly 10. In the embodiment of FIGS. 3 and 5, flanges 94—94 connect to the clasping assemblies 20 and 30 (e.g., more specifically to the lower arms 32a and 52a of the upper spring members 24 and 44). In the embodiment of FIGS. 2 and 6, flanges 94—94 connect to the base 12. The clip assembly 10 may be mounted to any suitable substratum 80 (e.g., a circuit board) through the assistance of screw 82 passing removably through eyelet 16 and connecting to the substratum 80, as best illustrated in FIG. 4. The flanges 94—94 function as physical stops to align the clip assembly 10 against any suitable edge or surface of the substratum 80 to prevent the clip assembly 10 from rotational movement. Stated alternatively, the flanges 94—94 assist in providing positional constrains to prevent the clip assembly 10 from rotating during installation (i.e., the coupling of the clip assembly 10 to the substratum 80).

The clasping assemblies 20 and 30 may engage any suitable cables, or the like, such as cables 41 and 61 having respective connectors 88 and 90, and enable the positioning of longitudinal sections of the cables 41 and 61 to the same height level as that of connectors 84 and 86 on the substratum 80 as best illustrated in FIG. 4. Connectors 88 and 90 of respective cables 41 and 61 may connect to connectors 86 and 84, respectively, or to connectors 84 and 86, respectively. Thus, in one embodiment of the invention, depending on the length of the cables 41 and 61, connector 90 associated with cable 61 may connect to connector 88 on the substratum 80, and connector 88 associated with cable 41 may connect to connector 86 on the substratum 80. In an alternative embodiment of the invention and as best illustrated in FIG. 4, the cables 41 and 61 may criss-cross each other such that connector 90 associated with cable 61 may connect to connector 86 on the substratum 80, and connector 88 associated with cable 41 may connect to connector 88 on the substratum 80. In various embodiments of the invention connectors 88 and 90 at the respective ends of cables 41 and 61 are generally aligned with each other.

Continuing to refer to FIG. 4, there is seen a top plan view of the clip assembly 10 engaging cables 41 and 61 and placing the cables 41 and 61 in a superimposed relationship such that a longitudinal section 41a of cable 41 is generally aligned with a longitudinal section 61a of cable 61 and the connectors 88 and 90 at the respective ends of cables 41 and 61 are generally aligned with each other.

The clip assembly 10 may be manufactured from any suitable material, such as thin flexible stainless steel. The clasping assemblies 20 and 30 (i.e., more particularly the lower spring members 22, 42 and the upper spring members 24, 44) are spring-like structures which are capable of being suitably flexed by a user. The cables 41 and 61 may be RF cables having a diameter ranging from about 0.50 mm to about 1.5 mm. Cables with other outer diameters can be fit into the clasping assemblies 20 and 30 by changing the geometry of the troughs 26 and 46 of the lower spring members 22 and 42, respectively.

By practice of various embodiments of the present invention there is provided a clip assembly 10 that may hold two small diameter RF (Radio Frequency) cables (e.g., a diameter ranging from about 1.00 mm to about 1.5 mm) steadily and securely. The clip assembly 10 provides excellent grounding, as well as providing directional lead angles for cables to connect to a radio board. No extra board space is required. Board space is conserved because there is a standoff (e.g., a screw) holding the radio board in place, and the standoff for the radio board is shared with the clip assembly by suspending the clip assembly on the standoff.

Practice of embodiments of the clip assembly 10 of the present invention protect RF cables from disconnecting and dangling during shipment. The clip assembly 10 also enables the positioning of RF cables to the same height level as that of connectors on the radio board, thus eliminating possible intermittent disconnection of RF cables to the connectors. The RF cables may be positioned and held securely by the clip assembly 10 while directly coupling to the connectors on the radio board. Practice of embodiments of the clip assembly 10 of the present invention includes a cost reduction approach comprising an integral clip unit holding two cables. The design of various embodiments of the clip assembly 10 and the spring characteristics of the material (e.g., flexible metal such as thin stainless steel, etc) from which the clip assembly 10 is manufactured, enable the cables to be easily engaged and disengaged from the clip assembly 10.

As indicated, further practice of embodiments of the clip assembly 10 of the present invention utilizes the spring characteristics of a metallic material, such as a thin stainless steel sheet. The design of various embodiments of the clip assembly 10 has two clasping assemblies located symmetrically to a center line. Each clasping assembly is positioned and angularly disposed on the clip assembly such as to have an angle that leads its associated cable to the connector on the radio board. Each clasping assembly comprises two spring members: a lower spring member and an upper spring member. The opening between the lower and upper spring members is such that a cable may be easily passed into the entrance after depressing the lower spring member downwardly (or lift the upper spring members if there is no space underneath the clip base) for enlarging the opening, then lodged in the lower spring member for positioning in a holding position, and subsequently clipped or clasped between the lower spring member and the upper spring member by releasing the downwardly depression on the lower spring member. To remove the cable, the lower spring member is pushed downwardly to release the clasping or clamping force exerted by the lower and upper spring members against the cable, and then the cable is withdrawn from between the lower spring member and the upper spring member.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any directional arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A chip, comprising:
   a base;
   a first clasping assembly coupled to said base; and
   a second clasping assembly coupled to said base, wherein each of said first and second clasping assemblies includes:
      a lower spring member coupled to said base, wherein said lower spring member includes a generally sinusoidal structure having a trough and terminating in a lower lip;
      an upper spring member coupled to said base, wherein said upper spring member includes a generally U-shaped structure having first and second arms separated by an opening through which said lower spring member adaptively lodges when engaged by a user, and wherein said first and second antis connect integrally to said base and terminate at an upper lip; and
      an entrance defined by said upper lip and a portion of said generally sinusoidal structure, said entrance being normally closed under a resilience of said upper and lower spring members, said entrance being opened to provide access to said trough when said lower lip is pressed down or said upper lip is lifted up.

2. The clip of claim 1, wherein said first clasping assembly comprises a first center line, and wherein said second clasping assembly comprises a second center line intersecting said first center line at a generally oblique angle.

3. The clip of claim 2, further comprising a base protrusion integrally bound to said base and having said first clasping assembly and said second clasping assembly coupled thereto.

4. The clip of claim 3, wherein said lower spring member is integrally bound to said base protrusion and said upper spring member is integrally bound to said base protrusion and to said base.

5. The clip of claim 2, wherein said generally sinusoidal structure is formed of substantially, only one cycle or period.

6. The clip of claim 2, further comprising a first flange member coupled to said first clasping assembly and a second flange member coupled to said second clasping assembly.

7. The clip of claim 1, further comprising a base protrusion integrally bound to said base and having said first clasping assembly and said second clasping assembly coupled thereto.

8. The clip of claim 7, wherein said lower spring member is integrally bound to said base protrusion and said upper spring member is integrally bound to said base protrusion and to said base.

9. The clip of claim 1, wherein said generally sinusoidal structure is formed of substantially only one cycle or period.

10. The clip of claim 1, further comprising at least one flange member coupled to said base.

11. The clip of claim 1, wherein each of said first and second arms includes a skewed structure defining a loop wherein a lower arm section is integrally bound to an upper arm section.

12. The clip of claim 11, wherein said lower arm section and said upper arm section are superimposedly positioned with respect to each other in a spaced vertical relationship.

* * * * *